(12) United States Patent
Teragawa

(10) Patent No.: US 9,995,871 B2
(45) Date of Patent: Jun. 12, 2018

(54) LIGHT-SOURCE DEVICE AND LIQUID CRYSTAL DISPLAY APPARATUS

(71) Applicant: Sakai Display Products Corporation, Sakai-shi, Osaka (JP)

(72) Inventor: Daisuke Teragawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 12 days.

(21) Appl. No.: 15/313,964

(22) PCT Filed: Aug. 21, 2014

(86) PCT No.: PCT/JP2014/071913
§ 371 (c)(1),
(2) Date: Nov. 24, 2016

(87) PCT Pub. No.: WO2016/027353
PCT Pub. Date: Feb. 25, 2016

(65) Prior Publication Data
US 2017/0108638 A1    Apr. 20, 2017

(51) Int. Cl.
*G02F 1/1333* (2006.01)
*F21V 8/00* (2006.01)

(52) U.S. Cl.
CPC ......... *G02B 6/0085* (2013.01); *G02B 6/0088* (2013.01); *G02F 1/133308* (2013.01); *G02F 2001/133314* (2013.01)

(58) Field of Classification Search
CPC .. G02B 6/0085; G02B 6/0088; G02B 6/0001; G02B 6/0011; G02B 6/0013; G02B 6/0015; G02B 6/0021; G02F 1/133308; G02F 1/133615; G02F 2001/133314
See application file for complete search history.

(56) References Cited

U.S. PATENT DOCUMENTS 9,664,846 B2 * 5/2017 Zhang .................. G02B 6/0088
2007/0279944 A1   12/2007 Sakai
(Continued)

FOREIGN PATENT DOCUMENTS

| JP | H9-160032 | 6/1997 |
|---|---|---|
| JP | 2001-312919 | 11/2001 |
| JP | 2008-16433 | 1/2008 |

(Continued)

*Primary Examiner* — Joseph L Williams
*Assistant Examiner* — Jose M Diaz
(74) *Attorney, Agent, or Firm* — Rudy J. Ng; Bret E. Field; Bozicevic, Field & Francis LLP

(57) ABSTRACT

A backlight 200 is provided with a frame body 9 that is in contact with a side surface of a light guide plate 5, and a non-light emitting region surrounding a light emitting region of a light emitting surface of an LED 60. The side surface of the light guide plate 5 and the LED 60 can be brought close to each other, while preventing a contact therebetween by means of the frame body 9. Furthermore, by means of the frame body 9, light emitted from the LED 60 is prevented from leaking out from between the light emitting surface of the LED 60 and the side surface of the light guide plate 5. Consequently, the ratio at which the light emitted from the LED 60 is inputted to the light guide plate 5 is increased, thereby improving luminance or power saving performance of the backlight 200.

15 Claims, 12 Drawing Sheets

(56) References Cited

U.S. PATENT DOCUMENTS

2008/0088763 A1    4/2008  Toriyama et al.
2014/0185271 A1*   7/2014  Hyun .................. G02B 6/0021
                                                    362/84

FOREIGN PATENT DOCUMENTS

| JP | 2008-89944   A | 4/2008  |
| JP | 2011-253769    | 12/2011 |
| JP | 2012-178368  A | 9/2012  |
| JP | 2014-63600     | 4/2014  |

* cited by examiner

F I G. 2
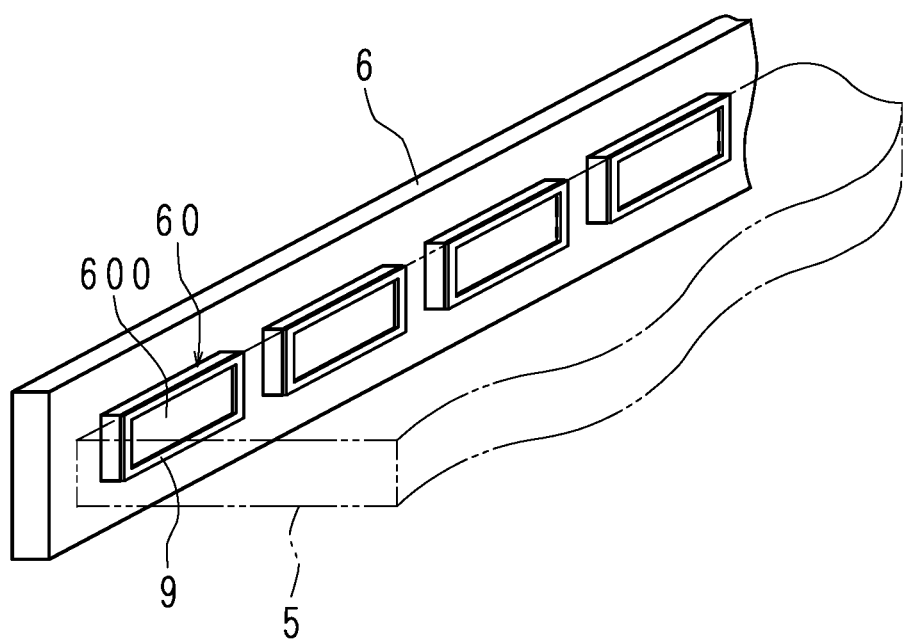

F I G. 3
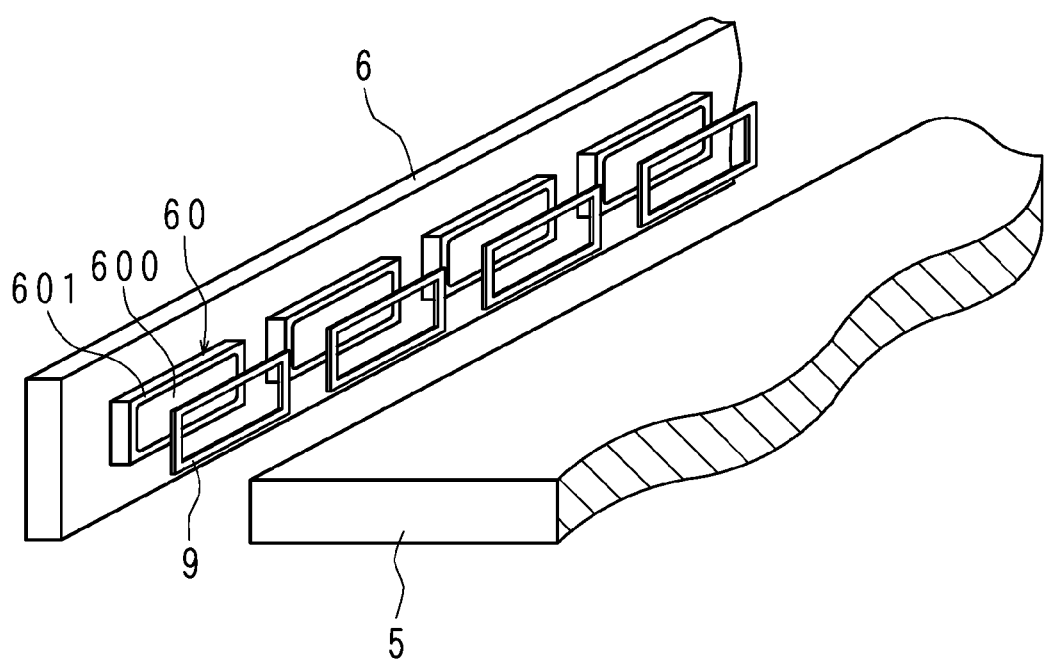

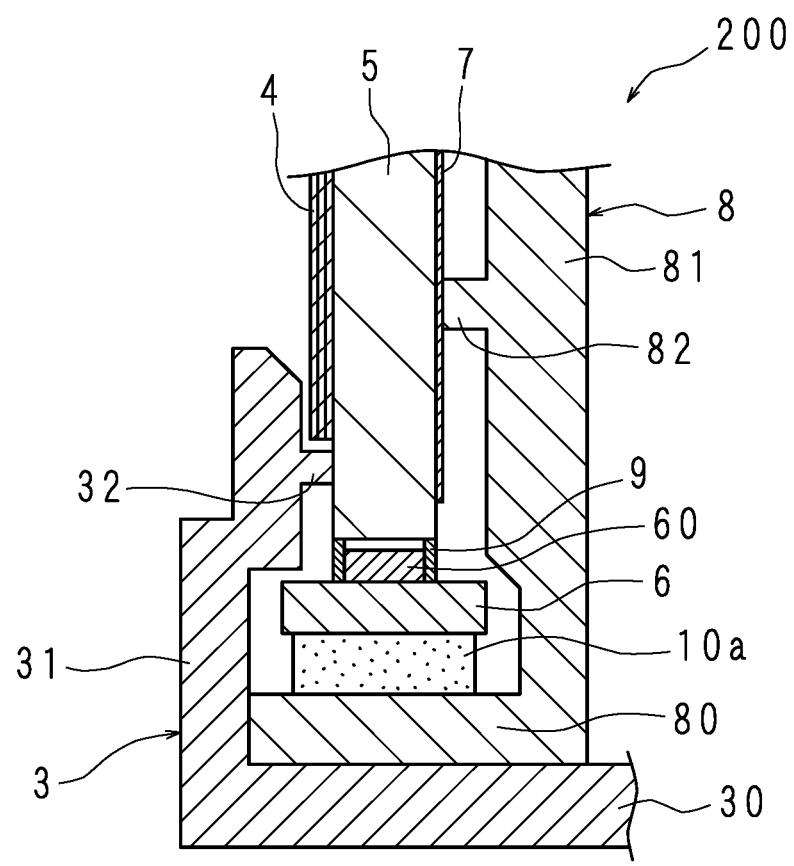
F I G. 4

F I G. 8
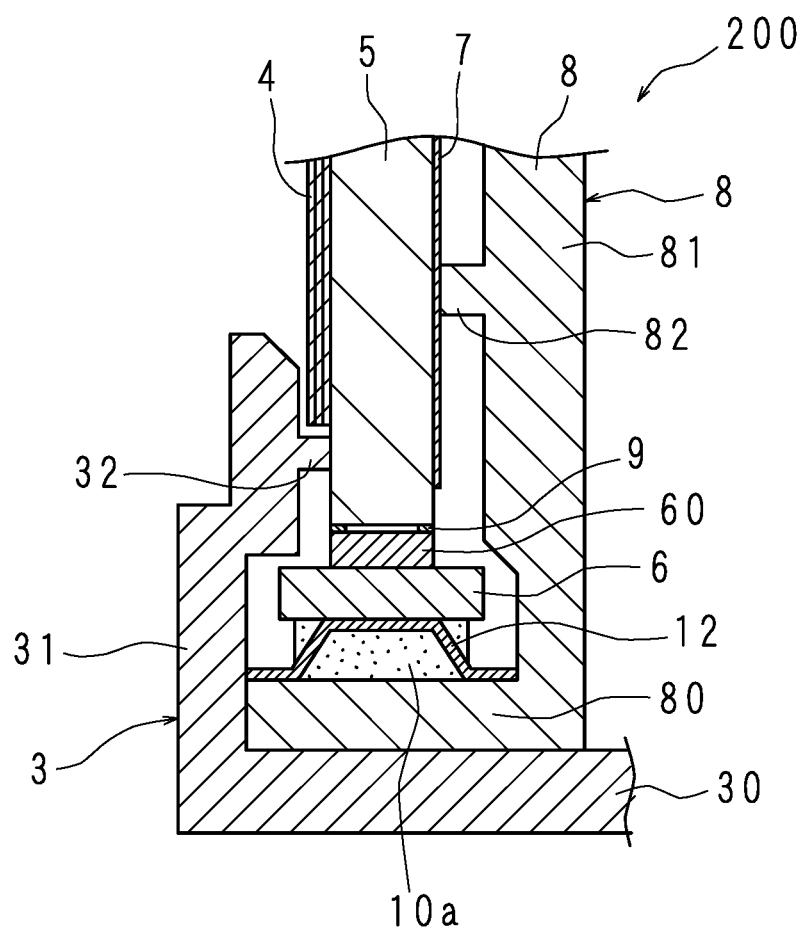

LIGHT-SOURCE DEVICE AND LIQUID CRYSTAL DISPLAY APPARATUS

CROSS-REFERENCE TO RELATED APPLICATIONS

This application is the national phase under 35 U. S. C. § 371 of PCT International Application No. PCT/JP2014/071913 which has an International filing date of Aug. 21, 2014 and designated the United States of America.

FIELD

The present invention relates to a light-source device which includes a light source, in particular, a dot light source such as LEDs, and a liquid crystal display apparatus including the light-source device.

BACKGROUND

Recently, as a display apparatus equipped in various electronic devices such as a television receiving apparatus, a personal computer, a portable information terminal, or a portable game machine, liquid crystal display apparatuses are frequently used, because of thinness, lightweight, and low power-consumption thereof. The liquid crystal display apparatus includes a liquid crystal panel forming a display screen, and a backlight (light-source device) for irradiating a back surface of the liquid crystal panel with light.

The backlight is divided into a direct type and an edge light type according to a position in which a light source is disposed. Among them, the edge light type is provided with a light guide plate facing the liquid crystal panel, and the light source such as LEDs is disposed to face a side surface of the light guide plate.

When vibrations or impacts are applied to a device equipped with the liquid crystal display apparatus employing the edge light type backlight, for example, during transporting, since the light source such as LEDs is disposed to face the side surface of the light guide plate, the side surface of the light guide plate and the light source contact with each other, such that the light source may be damaged. Further, also due to the light guide plate being thermally expanded by heat generated during emitting light by the light source, the side surface of the light guide plate and the light source may contact with each other.

As a solution of the above-described problems, for example, Japanese Patent Laid-open Publication No. 2008-89944 discloses a liquid crystal display apparatus including an edge light type backlight capable of preventing a contact between the side surface of the light guide plate and the LEDs by providing spacers therebetween.

SUMMARY

In the backlight of the liquid crystal display apparatus disclosed in Japanese Patent Laid-open Publication No. 2008-89944, the side surface of the light guide plate and the LEDs are installed at a prescribed interval by the spacers for preventing the contact therebetween. Therefore, a part of light emitted by the LEDs is lost without entering into the light guide plate.

As the side surface of the light guide plate approaches to the LEDs, a ratio of light entered into the light guide plate is increased, luminance of the liquid crystal display apparatus is improved, or a power is conserved.

However, in components of the backlight such as a light guide plate, an LED substrate, and the like, there exist variations in flatness derived from an accuracy of processing molding. Therefore, in the conventional configuration, in a state that the side surface of the light guide plate and the LEDs do not contact, it is difficult that the side surface of the light guide plate approaches to the LEDs less than a certain distance. In addition, in order to prevent the vibrations, impacts, or thermal expansion as described above, a constant clearance is required between the side surface of the light guide plate and the LEDs. Further, due to the variations in the flatness, there exist variations in the clearance between the side surface of the light guide plate and the LEDs. Therefore, the ratio of the light made incident on the side surface of the light guide plate from the LEDs is varied, and thereby luminance of the backlight may become uneven.

In consideration of the above-mentioned circumstances, it is an object of the present invention to provide a light-source device which may improve a ratio of light made incident on a side surface of a light guide plate from a light source to make luminance uniform, and a liquid crystal display apparatus which includes the light-source device and has improved power consumption performance and excellent display quality.

According to one aspect of the present invention, there is provided a light-source device which includes a light guide plate, a substrate in which light sources each of whose light emitting surfaces faces a side surface of the light guide plate are mounted on one surface thereof, a heat dissipation member disposed to face another surface of the substrate which is opposite to the one surface, and a heat conductor which is in contact with said another surface of the substrate and the heat dissipation member, the light-source device including: a frame body which surrounds a light emitting region on the light emitting surface of each of the light sources, and is in contact with the side surface of the light guide plate and a non-light emitting region located around the light emitting region on the light emitting surface or the one surface of the substrate.

According to the present invention, the substrate in which the light sources such as LEDs are disposed on one surface is installed so that the light emitting surface of each of the LEDs faces the side surface of the light guide plate. The light guide plate diffuses and reflects light entered to an inside through the side surface thereof, then emits the light from the inside through a front surface thereof. The heat dissipation member has one surface facing another surface of the substrate. The heat conductor is in contact with said another surface of the substrate and the one surface of the heat dissipation member, and allows heat generated from the LEDs on the substrate to be conducted to the heat dissipation member. The heat dissipation member dissipates the heat conducted from the substrate through the heat conductor, thereby suppressing an increase in a temperature of the LEDs. The frame body is in contact with the side surface of the light guide plate, and the non-light emitting region of each of the LEDs surrounding the light emitting region thereof or the substrate, thereby preventing the LEDs and the light guide plate from contacting with each other, and preventing the light emitted by the LEDs from being leaked out to an outside of a space surrounded by the frame body, the LEDs or the substrate, and the side surface of the light guide plate. Accordingly, a ratio of light entered into the light guide plate is improved.

In the light-source device according to the present invention, the heat conductor may have elasticity.

According to the present invention, the heat conductor may have elasticity. Accordingly, in a state in which the frame body is in contact with the side surface of the light guide plate and the LEDs, the heat conductor having elasticity is elastically deformed, such that variations in flatness of the side surface of the light guide plate, a relative displacement due to vibrations or impacts applied to the light-source device, and thermal expansion of the light guide plate may be absorbed.

In the light-source device according to the present invention, the frame body may have elasticity.

According to the present invention, the frame body may have elasticity. Accordingly, the frame body sandwiched between the side surface of the light guide plate and the LEDs is elastically deformed, such that variations in flatness of the side surface of the light guide plate, a relative displacement due to vibrations or impacts applied to the light-source device, and thermal expansion of the light guide plate may be absorbed.

The light-source device according to the present invention may further include a support member which supports the light guide plate and the heat dissipation member, and an elastic member, wherein the elastic member is in contact with an opposite surface of the heat dissipation member to a surface facing the substrate, and a surface of the support member facing the opposite surface.

According to the present invention, a casing has one surface facing another surface of the heat dissipation member. The elastic member is provided in contact with the other surface of the heat dissipation member and the one surface of the casing. Accordingly, the elastic member is elastically deformed, such that variations in flatness of the side surface of the light guide plate, a relative displacement due to vibrations or impacts applied to the light-source device, and thermal expansion of the light guide plate may be absorbed.

In the light-source device according to the present invention, the heat conductor may be a spring.

According to the present invention, the heat conductor may be a spring having thermal conductivity. Accordingly, the spring is elastically deformed, such that variations in flatness of the side surface of the light guide plate, a relative displacement due to vibrations or impacts applied to the light-source device, and thermal expansion of the light guide plate may be absorbed.

In the light-source device according to the present invention, the frame body may have a plurality of opening parts, and may be in contact with the light sources, or may be in contact with the one surface of the substrate by enclosing the light sources.

According to the present invention, the frame body may have a plurality of opening parts, and is in contact with the LEDs, or is in contact with the substrate so as to enclose the LEDs. Accordingly, the number of processes during assembling the frame body is decreased.

In the light-source device according to the present invention, the frame body may have adhesive properties.

According to the present invention, the frame body may have adhesive properties. Accordingly, the frame body may be adhered to the side surface of the light guide plate and the LEDs, such that a structure thereof is stable.

In the light-source device according to the present invention, the frame body may not have adhesive properties.

According to the present invention, the frame body may not have adhesive properties. Accordingly, the components are prevented from being damaged during disassembling and repairing the light-source device.

In the light-source device according to the present invention, the frame body may have a rib which is in contact with a side surface of the light source, and a rib which is in contact with a front surface and a back surface of the light guide plate.

According to the present invention, the frame body may have a rib which is in contact with the side surface perpendicular to the light emitting surface of the LEDs, and the rib which is in contact with the front surface and the back surface perpendicular to the side surface of the light guide plate. Accordingly, a work of attaching the frame body to the LEDs and the light guide plate is simple.

In the light-source device according to the present invention, the frame body may be white.

According to the present invention, the frame body may have a white color with high reflectance. Accordingly, a utilization rate of the light emitted by the light source is more improved.

In the light-source device according to the present invention, the substrate may have stretchability.

According to the present invention, the substrate may have stretchability. Accordingly, the substrate may be extended or contracted, such that the thermal expansion of the light guide plate may be absorbed.

According to another aspect of the present invention, there is provided a liquid crystal display apparatus including: the above-described light-source device which is provided on a back surface of a liquid crystal panel.

According to the present invention, the liquid crystal display apparatus includes the above-described light-source device. Accordingly, power consumption performance and uniformity of luminance of the liquid crystal display apparatus are improved.

According to the present invention, a loss of light of the light-source device may be decreased, thereby the luminance may be uniform, as well as the power consumption performance of the backlight and the liquid crystal display apparatus is improved, while ensuring an excellent display quality of the liquid crystal display apparatus.

The above and further objects and features will more fully be apparent from the following detailed description with accompanying drawings.

BRIEF DESCRIPTION OF THE DRAWINGS

FIG. 2 is a schematic perspective view illustrating an arrangement of a light guide plate, LEDs and frame bodies.

FIG. 3 is an exploded perspective view illustrating a positional relationship between the light guide plate, the LEDs and the frame bodies.

FIG. 4 is a schematic side cross-sectional view of a backlight according to a Modified Example 1 of Embodiment 1.

FIG. 8 is a schematic side cross-sectional view of the backlight according to the modified example of Embodiment 3.

DETAILED DESCRIPTION

Hereinafter, the present invention will be described in detail with reference to the accompanying drawings illustrating embodiments thereof.

Embodiment 1

Figure 1:
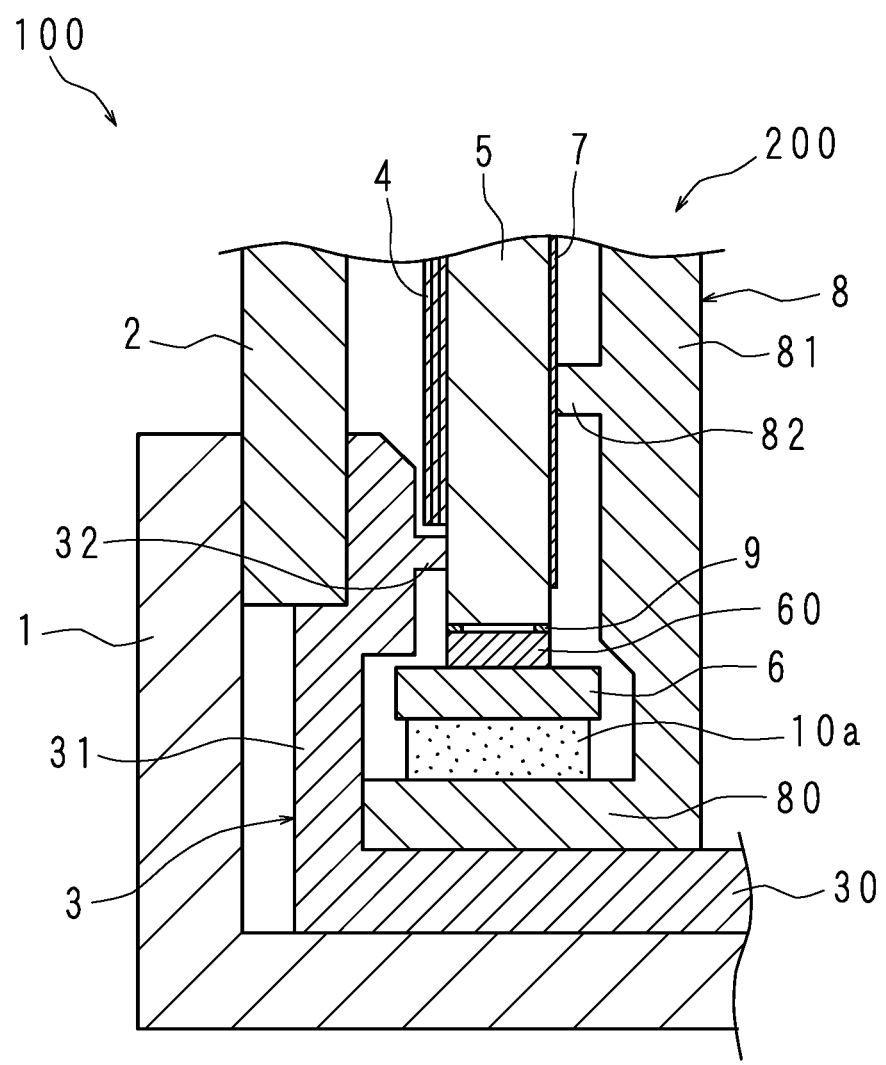
FIG. 1 is a schematic side cross-sectional view of a liquid crystal display apparatus according to the present invention.

FIG. 1 is a schematic side cross-sectional view of a liquid crystal display apparatus 100 according to the present invention. The liquid crystal display apparatus 100 includes a bezel 1, a liquid crystal panel 2, and a backlight 200 for irradiating the liquid crystal panel 2 with light. Further, the backlight 200 includes a light guide plate 5, an LED 60, an LED substrate 6, a chassis 3, a heat dissipation member 8, an optical sheet 4, and a reflection sheet 7. The LED 60 is mounted on one surface of the LED substrate 6, and has a light emitting surface substantially parallel to the one surface.

The light guide plate 5 is a rectangular shape, and has a front surface, a back surface, and four side surfaces. The light guide plate 5 is made by using, for example, a transparent acrylic resin. The LED substrate 6 is disposed so that the light emitting surface of the LED 60 mounted thereon face at least one side surface of the light guide plate 5. The LED substrate 6 is a substrate made of metal having high thermal conductivity such as, for example, aluminum. A plurality of optical sheets 4 are laminated on the front surface of the light guide plate 5 so as to cover a substantially entire area thereof. In addition, the reflection sheet 7 is disposed on the back surface of the light guide plate 5 so as to cover a substantially entire area of the back surface thereof.

Light emitted by the LED 60 enters into the light guide plate 5 through the side surface. The light entered into the light guide plate 5 is diffused within the light guide plate 5. The light diffused within the light guide plate 5 is partially reflected by the front surface or the side surface thereof, or is totally reflected by the reflection sheet 7 disposed on the back surface, and is emitted from the front surface. By the above-described configuration, the light guide plate 5 performs surface light emission using the LED 60 as a light source. The light emitted through the front surface of the light guide plate 5 transmits through the optical sheet 4, and enters into the liquid crystal panel 2.

A surface of the LED substrate 6 on a side opposite to the surface on which the LED 60 is mounted is close contact with one surface of a cushion material 10a. In the present embodiment, the cushion material 10a is a molded part of, for example, silicon rubber having high thermal conductivity and elasticity.

The heat dissipation member 8 is a molded part of, for example, metal having high thermal conductivity such as copper, or aluminum. The heat dissipation member 8 has a side surface part 80 facing the side surface of the light guide plate 5 and a back surface part 81 facing the back surface thereof. A back surface-pressing rib 82 provided on the light guide plate 5 side of the back surface part 81 protrudes to the light guide plate 5. The back surface-pressing rib 82 supports the light guide plate 5 by pressing from the back side of the light guide plate 5.

A surface facing the side surface of the light guide plate 5, in the side surface part 80 of the heat dissipation member 8, is close contact with the other surface of the cushion material 10a. By the cushion material 10a, heat generated during emitting light by the LED 60 is conducted to the heat dissipation member 8 from the LED substrate 6. The heat dissipation member 8 releases the heat conducted from the LED substrate 6, thereby cooling the LED 60 and the LED substrate 6.

The chassis 3 is a rectangular casing whose outer periphery is one size larger than the light guide plate 5. The chassis 3 has a side surface part 30 facing the side surface of the light guide plate 5, and a front surface part 31 facing the front surface thereof. The front surface part 31 of the chassis 3 has a front surface-pressing rib 32 on a front side of the light guide plate 5, which is protrusively provided. The front surface-pressing rib 32 supports the light guide plate 5 by pressing from the front side of the light guide plate 5. A surface facing the side surface of the light guide plate 5, in the side surface part 30 of the chassis 3, is close contact with a surface of the side surface part 80 of the heat dissipation member 8 on a side opposite to the light guide plate 5. By the above-described configuration, the chassis 3 supports the light guide plate 5 and the heat dissipation member 8. The chassis 3 corresponds to a support member described in the claims.

The liquid crystal panel 2 is supported by the bezel 1 and the chassis 3, and is disposed to face the front surface of the light guide plate 5. A surface of the liquid crystal panel 2 facing the light guide plate 5 is the back surface. A surface of the liquid crystal panel 2 on a side opposite to the back surface is a display surface which displays an image. The liquid crystal panel 2 displays the image on the display surface by controlling a transmission amount of light from the front surface of the light guide plate 5 of the backlight 200 to the back surface thereof.

Further, the casing (not illustrated) is jointed with the bezel 1, the liquid crystal panel 2 and the backlight 200 are housed by the casing and the bezel 1, such that the liquid crystal display apparatus 100 is constituted.

In the backlight 200 according to the present embodiment, a frame body 9 for preventing the light emitted by the LED 60 from being leaked out is provided between the side surface of the light guide plate 5 and the LED 60. FIG. 2 is a schematic perspective view illustrating an arrangement of the light guide plate 5, the LEDs 60 and the frame bodies 9. FIG. 3 is an exploded perspective view illustrating a positional relationship between the light guide plate 5, the LEDs 60 and the frame bodies 9.

The frame body 9 has light-shielding properties. In the present embodiment, the frame body 9 is formed, for example, by a double-sided tape having adhesive properties. As illustrated in FIGS. 2 and 3, a shape and a size of the frame body 9 is substantially the same as a non-light emitting region 601 enclosing a light emitting region 600 of the light emitting surface of the LED 60. One surface of the frame body 9 is adhered to the non-light emitting region 601. The other surface of the frame body 9 is adhered to the side surface of the light guide plate 5. By the above-described configuration, the frame body 9 prevents the light emitting surface of the LED 60 and the side surface of the light guide plate 5 from contacting with each other, and prevents the light emitted by the LED 60 from being leaked out through a gap between the light emitting surface of the LED 60 and the side surface of the light guide plate 5. Accordingly, a utilization rate of the light emitted by the LED 60.

The side surface of the light guide plate 5 and the light emitting surface of the LED 60 are a substantially flat surface, but there exist irregularities derived from an accuracy of processing molding. Therefore, a clearance between the side surface of the light guide plate 5 and the light emitting surface of the LED 60 is not constant, and there exist variations. In the backlight 200 according to the present embodiment, since the frame body 9 is adhered to the side surface of the light guide plate 5 and the light emitting surface of the LED 60 therebetween, a distance between the side surface of the light guide plate 5 and the light emitting surface of the LED 60 is substantially constant. As a result, variations in the clearance occur between the LED substrate 6 and the side surface part 80 of the heat dissipation member 8.

In the present embodiment, the cushion material 10a is pinched between the LED substrate 6 and the side surface part 80 of the heat dissipation member 8. Since a pressure is applied from the LED substrate 6 and the side surface part 80 of the heat dissipation member 8, the cushion material 10a is elastically deformed. By such an elastic deformation, a relative displacement due to vibrations or impacts, thermal expansion, and variations in the clearance are absorbed.

By the above-described configuration, in the present embodiment, the variations in the clearance are absorbed to improve the utilization rate of the light emitted by the LED 60. Accordingly, luminance of the backlight 200 is uniformed to improve power consumption performance and the luminance.

Modified Example 1 of Embodiment 1

FIG. 4 is a schematic side cross-sectional view of a backlight 200 according to a Modified Example 1 of Embodiment 1. As illustrated in FIG. 4, in the present modified example, one surface of a frame body 9 is adhered to a mounting surface of the LED substrate 6. The other surface of the frame body 9 is adhered to the side surface of the light guide plate 5. The LED 60 is inside of a space formed by the mounting surface of the LED substrate 6, the frame body 9, and the side surface of the light guide plate 5. By the above-described configuration, the frame body 9 prevents the light emitted by the LED 60 from being leaked out through a gap between the light emitting surface of the LED 60 and the side surface of the light guide plate 5.

The other configurations of the backlight 200 according to the present modified example are the same as those of the backlight according to Embodiment 1, and therefore will not be described.

By the above-described configuration, in Modified Example 1 of Embodiment 1, the utilization rate of the light emitted by the LED 60 is improved.

Modified Example 2 of Embodiment 1

In Modified Example 2 of Embodiment 1, the frame body 9 may be made of a material having high elasticity such as rubber. In this case, the relative displacement due to the vibrations or impacts, the thermal expansion, and the variations in the clearance may be absorbed by the frame body 9 in addition to the cushion material 10a.

The other configurations of the backlight 200 according to the present modified example are the same as those of the backlight according to Embodiment 1, and therefore will not be described.

By the above-described configuration, in Modified Example 2 of Embodiment 1, the variations in the clearance are absorbed to improve the utilization rate of the light emitted by the LED.

Embodiment 2

Figure 5:
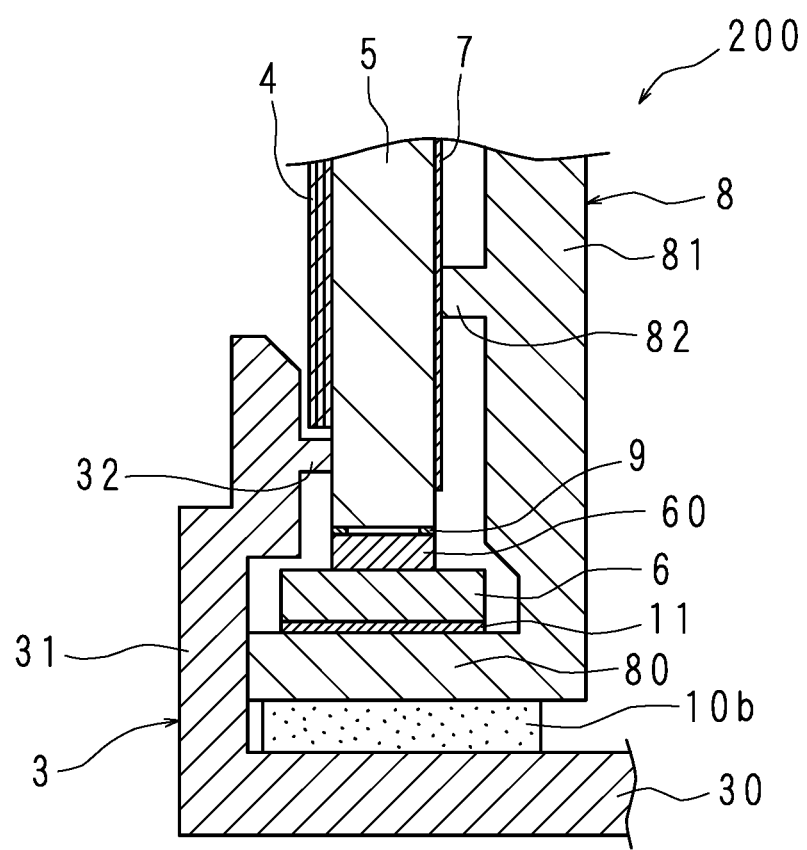
FIG. 5 is a schematic side cross-sectional view of a backlight according to Embodiment 2.

FIG. 5 is a schematic side cross-sectional view of a backlight 200 according to Embodiment 2. In the present embodiment, as illustrated in FIG. 5, said another surface of the LED substrate 6 different from the mounting surface thereof and a surface on the light guide plate 5 side of the side surface part 80 of the heat dissipation member 8 are adhered to each other by a heat conductive double-sided tape 11. By the heat conductive double-sided tape 11, heat generated during emitting light by the LED 60 is conducted to the heat dissipation member 8.

In addition thereto, in the present embodiment, a cushion material 10b is provided in close contact with the surface, on the side opposite to the light guide plate 5, of the side surface part 80 of the heat dissipation member 8, and a surface on the heat dissipation member 8 side of the side surface part 30 of the chassis 3. Herein, unlike Embodiment 1, since the heat conductive double-sided tape 11 serves a function of heat conduction, the cushion material 10b according to the present embodiment may not have thermal conductivity. That is, the cushion material 10b according to the present embodiment may use a cheaper material such as, for example, rubber, than the cushion material having thermal conductivity used in Embodiment 1.

The other configurations of the backlight 200 according to the present embodiment are the same as those of the backlight according to Embodiment 1, and therefore will not be described.

By the above-described configuration, in the present embodiment, the variations in the clearance are absorbed by a cheaper configuration to improve the utilization rate of the light emitted by the LED 60. Accordingly, luminance of the backlight 200 is uniformed to improve the power consumption performance and the luminance.

Embodiment 3

Figure 6:
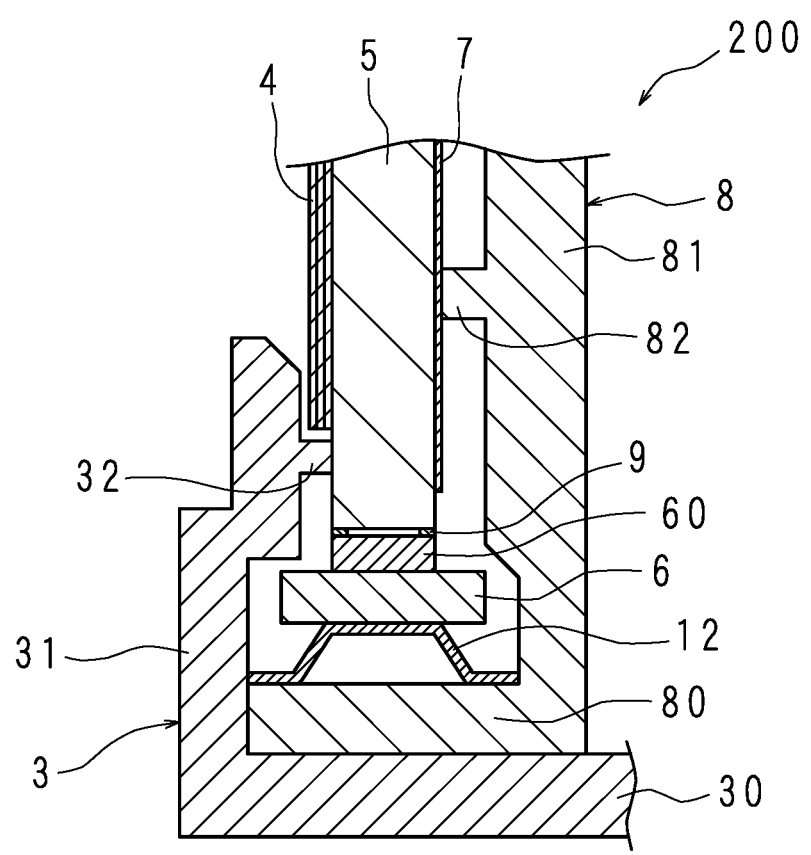
FIG. 6 is a schematic side cross-sectional view of a backlight according to Embodiment 3.

FIG. 6 is a schematic side cross-sectional view of a backlight 200 according to Embodiment 3. As illustrated in FIG. 6, in the backlight 200 according to the present embodiment, a spring 12 is provided between a surface on a side opposite to the mounting surface of the LED substrate 6 and a surface on the LED substrate 6 side of the side surface part 80 of the heat dissipation member 8, instead of the cushion material. The spring 12 is made of metal, and therefore, has thermal conductivity. In the example of FIG. 6, the spring 12 is a leaf spring. However, the spring 12 is not limited to the leaf spring, and may be a coil spring.

The other configurations of the backlight 200 according to the present embodiment are the same as those of the backlight according to the above-described embodiments, and therefore will not be described.

The spring 12 conducts the heat generated during emitting light by the LED 60 to the heat dissipation member 8 from the LED substrate 6. Simultaneously, since a pressure is applied from the LED substrate 6 and the heat dissipation member 8, the spring 12 is elastically deformed. By such an elastic deformation, the relative displacement due to the vibrations or impacts, the thermal expansion, and the variations in the clearance may be absorbed.

When a distance between the LED substrate 6 and the heat dissipation member 8 is increased and the pressure is not applied, a density of the cushion material 10*a* included in the backlight 200 according to Embodiment 1 becomes lower and the thermal conductivity is decreased. Meanwhile, even if the distance between the LED substrate 6 and the heat dissipation member 8 is increased, the spring 12 included in the backlight 200 according to the present embodiment does not lose the thermal conductivity. Accordingly, even when the distance between the LED substrate 6 and the heat dissipation member 8 is increased, the heat dissipation member 8 may cool the LED 60 and the LED substrate 6.

By the above-described configuration, in the present embodiment, the variations in the clearance are absorbed to improve the utilization rate of the light emitted by the LED 60. Accordingly, luminance of the backlight 200 is uniformed to improve the power consumption performance and the luminance.

Modified Example of Embodiment 3

Figure 7:
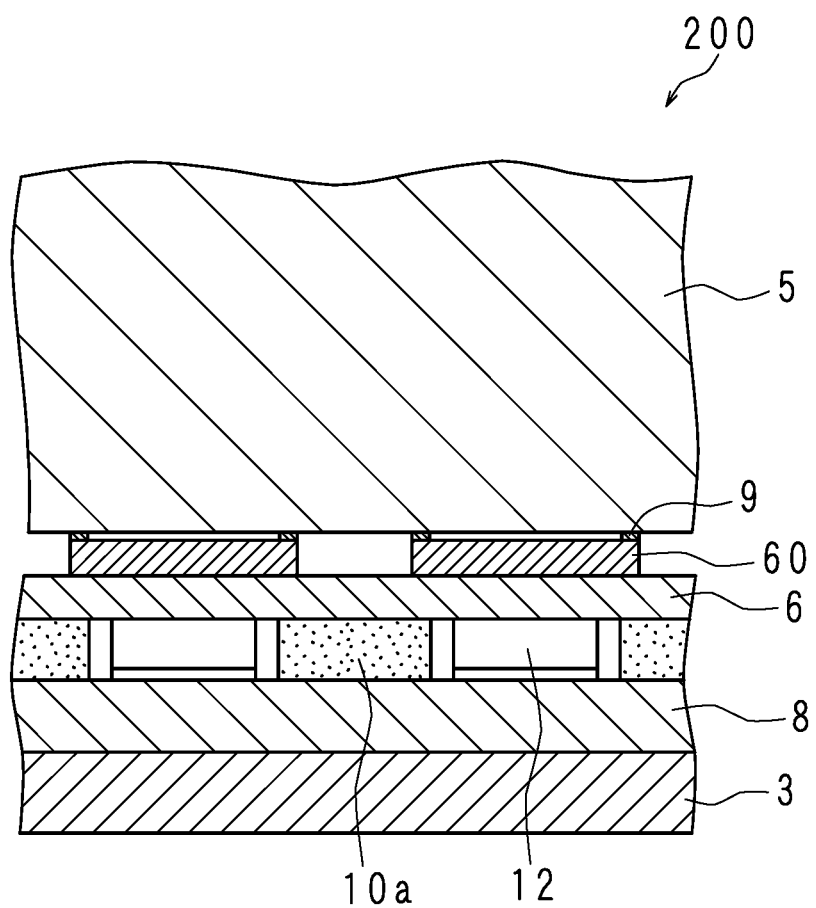
FIG. 7 is a schematic front view of a backlight according to a modified example of Embodiment 3 when viewing from a light emitting surface.

FIG. 7 is a schematic front view of a backlight 200 according to a modified example of Embodiment 3 when viewing from the light emitting surface. FIG. 8 is a schematic side cross-sectional view of the backlight 200 according to the modified example of Embodiment 3. As illustrated in FIGS. 7 and 8, further, the backlight 200 according to the present modified example also includes a cushion material 10*a* between the surface on the side opposite to the mounting surface of the LED substrate 6 and the surface on the LED substrate 6 side of the side surface part 80 of the heat dissipation member 8, in addition to the spring 12. The cushion material 10*a* according to the present modified example has high thermal conductivity and elasticity similar to the cushion material according to Embodiment 1.

The other configurations of the backlight 200 according to the present modified example are the same as those of the backlight according to Embodiment 3, and therefore will not be described.

As described above, the distance between the LED substrate 6 and the heat dissipation member 8 is increased, therefore, the thermal conductivity of the cushion material 10*a* may be decreased. Also in such the case, since the spring 12 is provided between the LED substrate 6 and the heat dissipation member 8, heat may be conducted from the LED substrate 6 to the heat dissipation member 8 by the spring 12. Meanwhile, when the LED substrate 6 and the heat dissipation member 8 are adjacent to each other, the heat may be more efficiently conducted from the LED substrate 6 to the heat dissipation member 8 by the spring 12 and the cushion material 10*a*.

By the above-described configuration, in the present modified example, the LED 60 and the LED substrate 6 may be more efficiently cooled.

Embodiment 4

Figure 9:
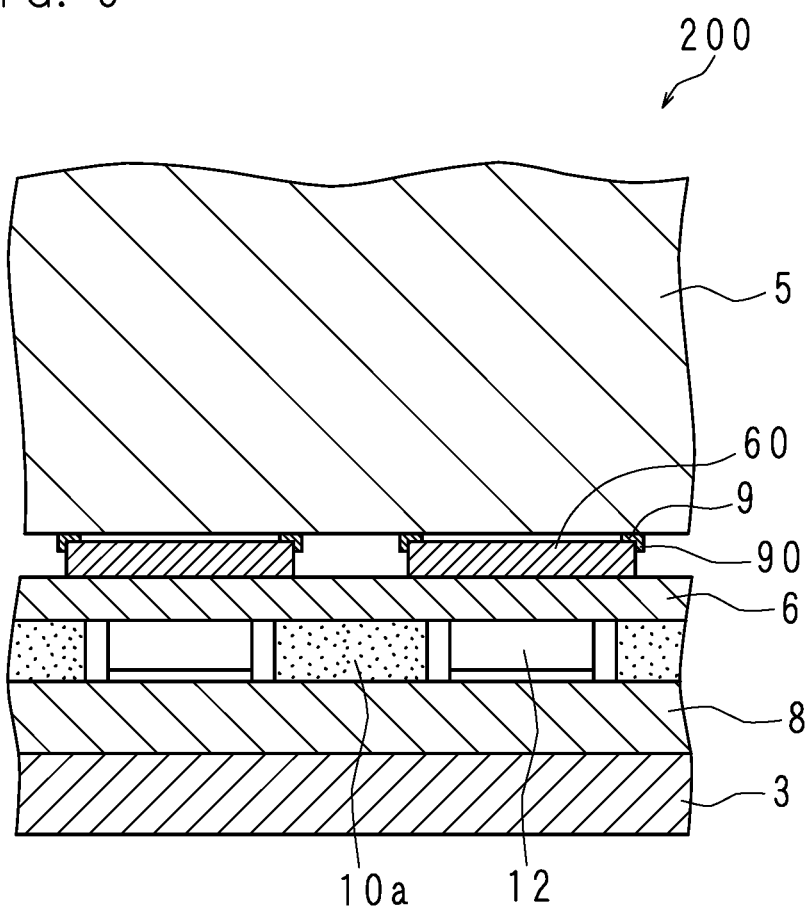
FIG. 9 is a schematic front view of a backlight according to Embodiment 4 when viewing from the light emitting surface.
Figure 10:
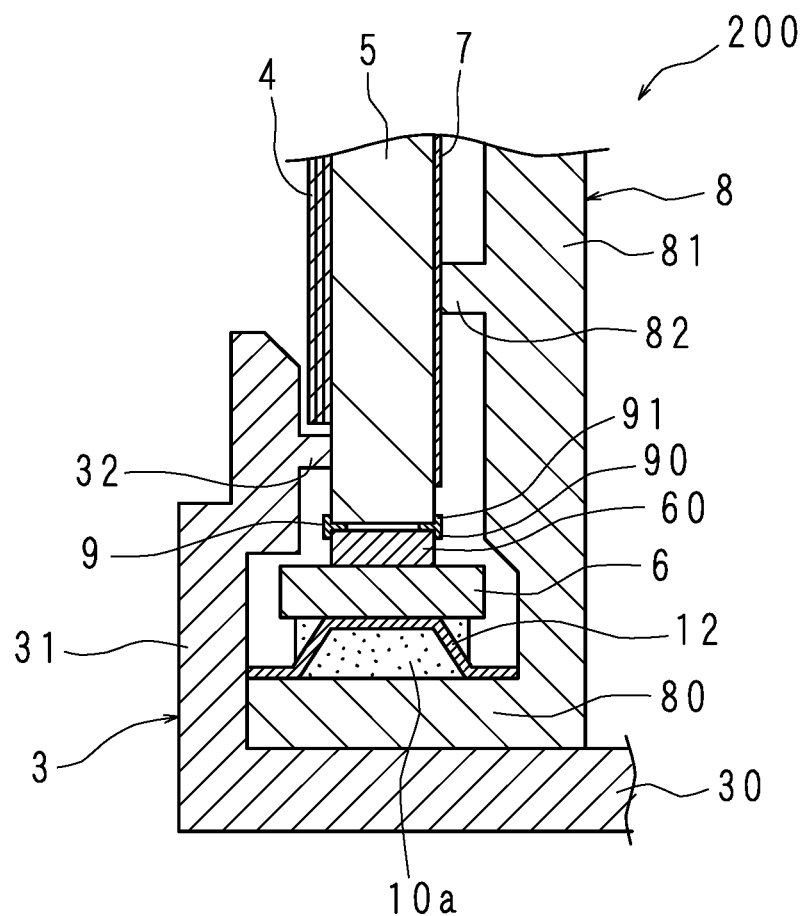
FIG. 10 is a schematic side cross-sectional view of the backlight according to Embodiment 4.

FIG. 9 is a schematic front view of a backlight 200 according to Embodiment 4 when viewing from the light emitting surface. FIG. 10 is a schematic side cross-sectional view of the backlight 200 according to Embodiment 4. As illustrated in FIGS. 9 and 10, a frame body 9 included in the backlight 200 according to the present embodiment is disposed in close contact with the side surface of the light guide plate 5 and the non-light emitting region 601 of the light emitting surface of the LED 60 to be pinched by these parts, similar to the above-described other embodiments. However, unlike the above-described other embodiments, the frame body 9 according to the present embodiment does not have adhesive properties. Since a pressure is applied on the side surface of the light guide plate 5 and the non-light emitting region 601 of the LED 60, the frame body 9 is supported.

Further, as illustrated in FIG. 10, the frame body 9 has an LED-positioning rib 90 at an end face thereof on the LED 60 side, which extends perpendicular to the end face. The LED-positioning rib 90 is formed in a rectangular shape, and an inner periphery thereof substantially coincides with an outer periphery of the light emitting surface of the LED 60. Therefore, when attaching the frame body 9 to the LED 60, the LED-positioning rib 90 is in contact with four side surfaces of the LED 60 perpendicular to the light emitting surface. Accordingly, by the LED-positioning rib 90, when attaching the frame body 9 to the LED 60, an attachment position thereof may be easily determined.

In addition, the frame body 9 has two light guide plate-positioning ribs 91 at an end face thereof on the light guide plate 5 side, which extends perpendicular to the end face. The light guide plate-positioning ribs 91 are provided so as to extend parallel to the front surface and the back surface of the light guide plate 5. An interval between surfaces of the two light guide plate-positioning ribs 91, which are opposite to each other, substantially coincides with a thickness of the light guide plate 5. Therefore, when attaching the frame body 9 to the light guide plate 5, the two light guide plate-positioning ribs 91 are in contact with the front surface and the back surface of the light guide plate 5, respectively. Thereby, when attaching the frame body 9 to the light guide plate 5, an attachment position thereof may be easily determined.

The other configurations of the backlight 200 according to the present embodiment are the same as those of the backlight according to the above-described embodiments, and therefore will not be described.

In the present embodiment, since the frame body 9 does not have adhesive properties, the backlight 200 may be easily disassembled and repaired. In addition, the LED 60 may be prevented from being damaged during disassembling the backlight 200. Therefore, the parts may be easily reused when recycling the backlight 200.

Further, the frame body 9 according to the present embodiment may be made of, for example, a material having high reflectance such as a white resin. Since the frame body 9 has the high reflectance, a ratio of light absorbed into the frame body 9 is very small. Accordingly, the utilization rate of the light emitted by the LED 60 may be more improved.

By the above-described configuration, in the present embodiment, the components may not be damaged during disassembling and repairing, or recycling the backlight 200. Accordingly, disassembling and repairing, or recycling of the backlight 200 may be efficiently performed.

Modified Example of Embodiment 4

Figure 11:
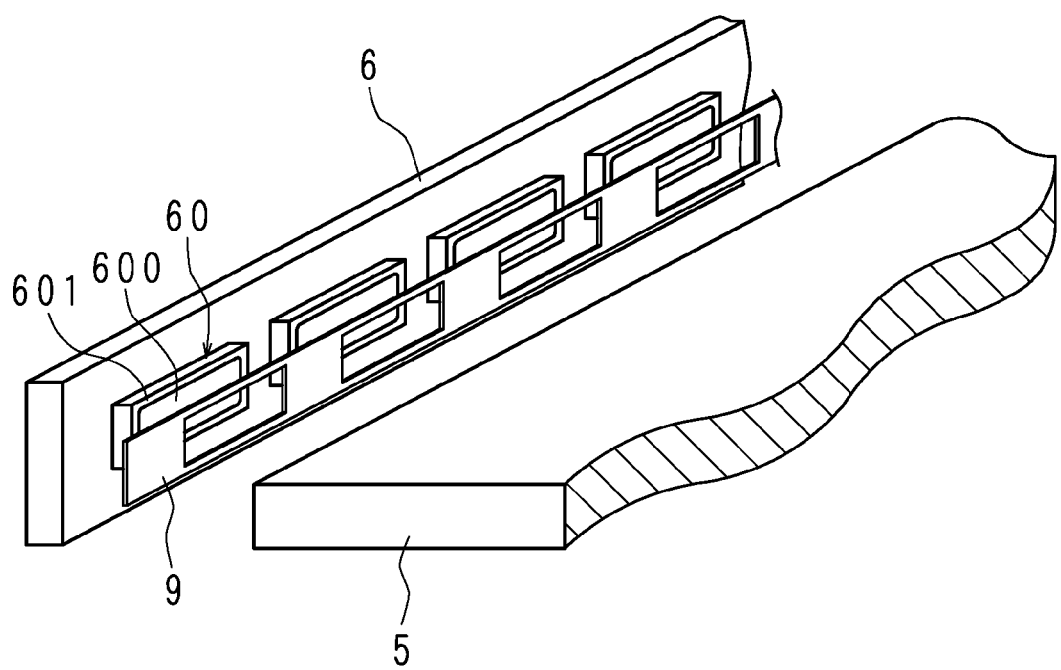
FIG. 11 is a perspective view illustrating an example of a frame body included in the backlight according to a modified example of Embodiment 4.

FIG. 11 is a perspective view illustrating an example of a frame body 9 included in the backlight 200 according to a modified example of Embodiment 4. As illustrated in FIG. 11, the frame body 9 according to the present modified example has a plurality of opening parts, so as to be simultaneously attached to LEDs 60. Thereby, since the LEDs 60 may be attached to the frame body 9 at one time, the number of processes during assembling the backlight 200 is decreased.

The other configurations of the backlight 200 according to the present modified example are the same as those of the backlight according to Embodiment 4, and therefore will not be described.

By the above-described configuration, in the present modified example, the number of processes during assembling the backlight 200 may be decreased.

Embodiment 5

Figure 12:
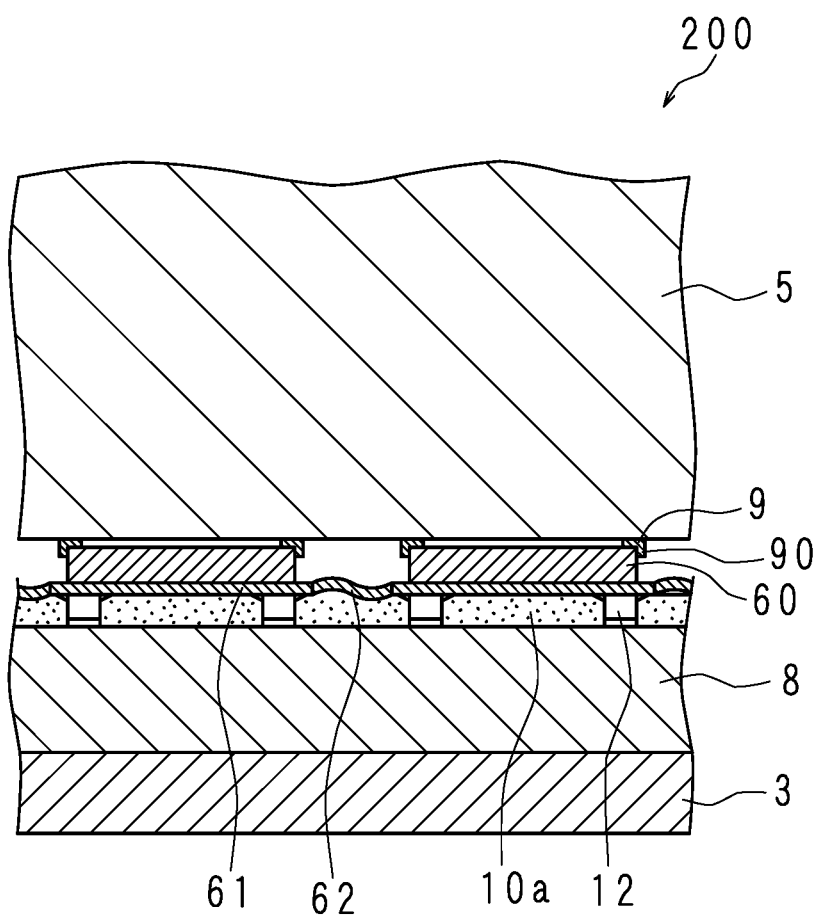
FIG. 12 is a schematic front view of a backlight according to Embodiment 5 when viewing from a light emitting surface.

FIG. 12 is a schematic front view of a backlight 200 according to Embodiment 5 when viewing from the light emitting surface. As illustrated in FIG. 12, an LED substrate 6 according to the present embodiment includes a plurality of LED mounting parts 61 on each of which the LED 60 is mounted, and extension/contraction adjustment parts 62 that are provided between the respective LED mounting parts 61 and can be extended or contracted. The LED mounting part 61 is, for example, an aluminum substrate similar to the LED substrate 6 according to the other embodiments, and the extension/contraction adjustment part 62 is a flexible substrate in which a copper wiring is sandwiched by, for example, insulation sheets having heat resistance. The extension/contraction adjustment part 62 is disposed in a loose state without being subjected to a tension. Therefore, the LED substrate 6 may be extended or contracted as a whole. Alternately, it may be a configuration in which the entire LED substrate 6 is a flexible substrate.

The other configurations of the backlight 200 according to the present embodiment are the same as those of the backlight according to the above-described embodiments, and therefore will not be described.

Heat generated during emitting light by the LED 60 or heat generated due to other reasons may be applied to the light guide plate 5 and the LED substrate 6. In such a case, each part of the light guide plate 5 and the LED substrate 6 is thermally expanded by the heat. In this case, since the light guide plate 5 made of an acrylic resin and the LED mounting part 61 made of metal have different thermal expansion rates from each other, amounts of thermal expansion of the light guide plate 5 and the LED mounting part 61 are different from each other in a direction parallel to the light emitting surface of the LED 60.

When the light guide plate 5 and the LED substrate 6 are thermally expanded by different amounts of thermal expansion from each other, a relative position of the LED substrate 6 with respect to the side surface of the light guide plate 5 tend to be changed in the direction parallel to the light emitting surface of the LED 60. In such a case, the extension/contraction adjustment part 62 of the LED substrate 6 is extended or contracted, such that a distance between the LED mounting parts 61 is adjusted, and the relative position of the LED mounting part 61 with respect to the side surface of the light guide plate 5 is maintained in an unchangeable state. Accordingly, even if the frame body 9, the side surface of the light guide plate 5 and the light emitting surface of the LED 60 are adhered to each other, the frame body 9 is prevented from being damaged.

The extension and contraction of the entire LED substrate 6 are adjusted by the extension/contraction adjustment part 62 so as to cope with the thermal expansion of the light guide plate 5, whereas due to respective thermal expansions of the LED mounting parts 61, the relative positions of the other portions with respect to respective center points of the LED mounting parts 61 are changed. In such a case, as described above, since the thermal expansion rate of the LED mounting part 61 and the thermal expansion rate of the light guide plate 5 are different from each other, the frame body 9 adhered thereto may be damaged. Compared with this, when the frame body 9 which has stretchability but does not have adhesive properties is pinched by the side surface of the light guide plate 5 and the light emitting surface of the LED 60, the frame body 9 is extended or contracted, thereby copying with the thermal expansion. Accordingly, the frame body 9 is prevented from being damaged due to the thermal expansion of the LED mounting part 61.

By the above-described configuration, in the present embodiment, changes due to the thermal expansion of each part are absorbed. Accordingly, each part is prevented from being damaged.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A light-source device, comprising
a light guide plate;
a substrate in which light sources are mounted on one surface thereof, wherein each of the light sources has a light emitting surface facing a side surface of the light guide plate, the light emitting surface having a light emitting region and a non-light emitting region located around the light emitting region;
a heat dissipation member disposed to face another surface of the substrate which is opposite to the one surface;
a heat conductor which is disposed between said another surface of the substrate and the heat dissipation member, and which is in contact with said another surface of the substrate and the heat dissipation member; and
a frame body which is disposed between the side surface of the light guide plate and the light emitting surface so as to surround the light emitting region on the light emitting surface, and which is in contact with the side surface of the light guide plate and the non-light emitting region on the light emitting surface.

2. The light-source device according to claim 1, wherein the heat conductor has elasticity.

3. The light-source device according to claim 1, wherein the frame body has elasticity.

4. The light-source device according to claim 1, further comprising:
a support member which supports the light guide plate and the heat dissipation member; and
an elastic member which is in contact with an opposite surface of the heat dissipation member which is opposite to a surface facing the substrate, and in contact with a surface of the support member facing the opposite surface.

5. The light-source device according to claim 2, wherein the heat conductor is a spring.

6. The light-source device according to claim 1, wherein the frame body has a plurality of opening parts, and is in contact with the light sources, or is in contact with the one surface of the substrate by enclosing the light sources.

7. The light-source device according to claim 1, wherein the frame body has adhesive properties.

8. The light-source device according to claim 1, wherein the frame body does not have adhesive properties.

9. The light-source device according to claim 8, wherein the frame body has a rib which is in contact with a side surface of each of the light sources, and a rib which is in contact with a front surface and a back surface of the light guide plate.

10. The light-source device according to claim 1, wherein the frame body is white.

11. The light-source device according to claim 1, wherein the substrate has stretchability.

12. A liquid crystal display apparatus, comprising:
a liquid crystal panel; and
the light-source device according to claim 1 which is provided on a back surface of the liquid crystal panel.

13. The light-source device according to claim 5, further comprising a cushion material disposed between said another surface of the substrate and the heat dissipation member.

14. The light-source device according to claim 13, wherein the cushion material has elasticity.

15. The light-source device according to claim 13, wherein the cushion material is a thermally conductive cushion material.

* * * * *